(12) United States Patent
O'Dougherty et al.

(10) Patent No.: US 7,747,344 B2
(45) Date of Patent: *Jun. 29, 2010

(54) LIQUID HANDLING SYSTEM WITH ELECTRONIC INFORMATION STORAGE

(75) Inventors: Kevin T. O'Dougherty, Arden Hills, MN (US); Robert E Andrews, Hudson, MA (US)

(73) Assignee: Advanced Technology Materials, Inc., Danbury, CT (US)

( * ) Notice: Subject to any disclaimer, the term of this patent is extended or adjusted under 35 U.S.C. 154(b) by 172 days.

This patent is subject to a terminal disclaimer.

(21) Appl. No.: 10/139,104

(22) Filed: May 3, 2002

(65) Prior Publication Data
US 2003/0004608 A1    Jan. 2, 2003

Related U.S. Application Data

(63) Continuation-in-part of application No. 09/880,472, filed on Jun. 13, 2001, now Pat. No. 6,879,876.

(51) Int. Cl.
*G06F 17/00* (2006.01)

(52) U.S. Cl. ............... 700/231; 700/239; 700/244; 700/265; 700/266; 700/281; 73/866.5

(58) Field of Classification Search ............ 200/231, 200/265–273, 281, 285, 239; 324/696, 637, 324/639, 663; 702/45–55; 340/618, 620, 340/572.1–572.9; 700/105, 110, 230, 231, 700/239, 244, 265–273, 281–285; 73/866.5; 174/47; 137/177, 251.1, 798; 455/66
See application file for complete search history.

(56) References Cited

U.S. PATENT DOCUMENTS 4,951,512 A * 8/1990 Mazza et al. ............ 73/864.23
5,014,208 A * 5/1991 Wolfson ..................... 700/99
5,102,010 A * 4/1992 Osgar et al. ................ 222/1
5,223,796 A   6/1993 Waldman et al.
5,385,060 A * 1/1995 Wang ...................... 73/866.5

(Continued)

FOREIGN PATENT DOCUMENTS

JP    2002-181296 A    6/2002

(Continued)

OTHER PUBLICATIONS

U.S. Appl. No. 10/139,185, filed May 3, 2002, Chilcoate, et al.

(Continued)

*Primary Examiner*—Jeffrey A Shapiro
(74) *Attorney, Agent, or Firm*—Vincent K. Gustafson; Intellectual Property/Technology Law; Maggie Chappuis

(57) ABSTRACT

The present invention relates to a system for handling liquid and a method for the same. The system includes a container capable of holding a liquid. An electronic storage device is coupled with the container for electronically storing information relating to the liquid stored in the container. The system can be configured with an antenna, for storing information to and reading information from the electronic storage device. A microprocessor-based controller, coupled with the antenna, may be employed for controlling processing of the liquid based on information read from the electronic storage device by the antenna.

77 Claims, 4 Drawing Sheets

U.S. PATENT DOCUMENTS

| | | | |
|---|---|---|---|
| 5,524,794 A | 6/1996 | Benedetti, Jr. et al. | 222/153.14 |
| 5,539,188 A | 7/1996 | Fallah et al. | 235/375 |
| 5,558,083 A | 9/1996 | Bathe et al. | 128/203.12 |
| 5,594,162 A * | 1/1997 | Dolan et al. | 73/46 |
| 5,604,681 A * | 2/1997 | Koeninger | 700/285 |
| 5,627,517 A | 5/1997 | Theimer et al. | |
| 5,635,652 A | 6/1997 | Beaudin | |
| 5,638,285 A | 6/1997 | Newton | 364/479.11 |
| 5,651,402 A | 7/1997 | McCaul | |
| 5,737,221 A | 4/1998 | Newton | 364/424.07 |
| 5,744,696 A | 4/1998 | Wang et al. | |
| 5,802,859 A * | 9/1998 | Zugibe | 62/125 |
| 5,803,673 A | 9/1998 | Reinsch et al. | 406/31 |
| 5,852,590 A | 12/1998 | De La Huerga | |
| 5,875,921 A | 3/1999 | Osgar et al. | 222/1 |
| 5,883,376 A | 3/1999 | Rosch et al. | 235/375 |
| 5,893,263 A * | 4/1999 | Matsumoto et al. | 156/387 |
| 5,940,780 A | 8/1999 | Azar et al. | |
| 5,942,980 A | 8/1999 | Hoben et al. | |
| 5,949,049 A | 9/1999 | McCarrick et al. | 235/375 |
| 5,953,682 A * | 9/1999 | McCarrick et al. | 702/45 |
| 5,955,684 A | 9/1999 | Gravel et al. | |
| 6,065,638 A | 5/2000 | Terranova et al. | |
| 6,067,844 A | 5/2000 | Westbrook et al. | |
| 6,140,146 A * | 10/2000 | Brady et al. | 438/62 |
| 6,147,662 A * | 11/2000 | Grabau et al. | 343/895 |
| 6,161,706 A | 12/2000 | McCord | 211/85.18 |
| 6,165,347 A | 12/2000 | Warburton | |
| 6,206,240 B1 | 3/2001 | Osgar et al. | 222/39 |
| 6,209,592 B1 * | 4/2001 | Gilboa et al. | 141/94 |
| 6,234,006 B1 | 5/2001 | Sunshine et al. | |
| 6,271,753 B1 | 8/2001 | Shukla | |
| 6,275,746 B1 | 8/2001 | Leatherman et al. | |
| 6,281,787 B1 | 8/2001 | Lerg et al. | |
| 6,282,458 B1 | 8/2001 | Murayama et al. | 422/108 |
| 6,318,568 B1 | 11/2001 | McCord | 211/85.18 |
| 6,405,745 B1 | 6/2002 | Kar et al. | 137/2 |
| 6,446,644 B1 * | 9/2002 | Dolechek | 134/57 R |
| 6,516,249 B1 | 2/2003 | Hoyle et al. | |
| 6,524,774 B1 | 2/2003 | Sonderman | |
| 6,542,848 B1 | 4/2003 | Neeser et al. | |
| 6,545,592 B2 | 4/2003 | Weiner | |
| 6,556,027 B2 * | 4/2003 | Banks | 324/700 |
| 6,556,832 B1 | 4/2003 | Soliman | |
| 6,556,889 B2 * | 4/2003 | Rudick et al. | 700/244 |
| 6,556,949 B1 * | 4/2003 | Lyon | 702/182 |
| 6,558,620 B1 * | 5/2003 | Sanford et al. | 422/28 |
| 6,571,151 B1 * | 5/2003 | Leatherman | 700/282 |
| 6,592,043 B1 * | 7/2003 | Britton | 235/492 |
| 6,597,175 B1 * | 7/2003 | Brisco | 324/326 |
| 6,618,714 B1 * | 9/2003 | Abrahams | 706/45 |
| 6,633,796 B1 | 10/2003 | Pool et al. | |
| 6,642,897 B2 * | 11/2003 | Forster et al. | 343/767 |
| 6,649,829 B2 * | 11/2003 | Garber et al. | 174/47 |
| 6,672,341 B2 * | 1/2004 | Bartholomew et al. | 141/18 |
| 6,720,866 B1 * | 4/2004 | Sorrells et al. | 340/10.4 |
| 6,732,945 B2 * | 5/2004 | Dolechek | 239/65 |
| 6,843,414 B2 * | 1/2005 | Madrid et al. | 235/385 |
| 6,879,876 B2 | 4/2005 | O'Dougherty et al. | |
| 7,061,831 B2 * | 6/2006 | De La Huerga | 368/10 |
| 2001/0052465 A1 * | 12/2001 | Dordi et al. | 205/95 |
| 2002/0078363 A1 * | 6/2002 | Hill et al. | 713/189 |
| 2004/0172180 A1 | 9/2004 | O'Dougherty et al. | |
| 2005/0177274 A1 | 8/2005 | O'Dougherty et al. | |

FOREIGN PATENT DOCUMENTS

| | | | |
|---|---|---|---|
| JP | 2003-139884 A | | 5/2003 |
| WO | WO 00/54724 | * | 9/2000 |

OTHER PUBLICATIONS

U.S. Appl. No. 10/139,186, filed May 3, 2002, Wertenberger.

Philips Semiconductort, mifare System Overview, Dec. 1998.

Philips Semiconductor, Controllers for High Security, Crypto and Dual Interface Smart Cards, Mar. 1999.

Lorefice, Bob, et al., How to Minimize Resist Usage During Spin Coating, Semiconductor International; found online Sep. 29, 2006 at http://www.reed-electronics.com/semiconductor/article/CA164074?pubdate=6%2F1%2F1998, Jun. 1, 1998, Publisher: Reed Business Information.

* cited by examiner

LIQUID HANDLING SYSTEM WITH ELECTRONIC INFORMATION STORAGE

CROSS-REFERENCE TO RELATED APPLICATION(S)

This application is a continuation-in-part of U.S. patent application Ser. No. 09/880,472, entitled "Liquid Handling System With Electronic Information Storage," filed on Jun. 13, 2001, and subsequently issued as U.S. Pat. No. 6,879,876 on Apr. 12, 2005, in the name of Kevin O'Dougherty and Robert E. Andrews and is incorporated herein by reference in its entirety.

The disclosures of the following patents are hereby incorporated herein by reference in their respective entireties: U.S. Pat. No. 7,188,644 of Dennis Chilcote and Wayne Kelley, entitled "APPARATUS AND METHOD FOR MINIMIZING THE GENERATION OF PARTICLES IN ULTRAPURE LIQUIDS;" and U.S. Pat. No. 6,698,619 of Richard Wertenberger, entitled "RETURNABLE AND REUSABLE, BAG-IN-DRUM FLUID STORAGE AND DISPENSING CONTAINER SYSTEM."

TECHNICAL FIELD OF THE INVENTION

This invention relates to a storage and dispensing system for the storage and dispensing of liquids. In particular, the invention relates to using a radio frequency identification tag and a radio frequency antenna to assure proper association of a particular liquid to a particular process.

BACKGROUND OF THE INVENTION

Certain manufacturing processes require the use of liquid chemicals such as acids, solvents, bases, photoresists, CMP slurries, dopants, inorganic, organic and biological solutions, pharmaceuticals, and radioactive chemicals. Often, these processes require a specific liquid chemical for each particular process. Furthermore, each process may require a specific liquid chemical at various stages of the process. Storage and dispensing systems in many instances are arranged to allow alternative containers to be used to deliver liquid chemicals to a manufacturing process at a specified time. Consequently, manufacturing personnel need to change the liquid chemical being used for the particular process at the specified time so that the system delivers the correct liquid chemical to the manufacturing process. It is critical that the proper liquid chemical be installed into the systems for the particular process. If the incorrect liquid chemical is installed for a particular process, personnel may be put at risk. Furthermore, equipment and the articles under manufacture may be severely damaged or even rendered useless for their intended functions.

Prior art systems have attempted to utilize unique pump connectors that will only fit with a correct container. Each container has a unique configuration based on the liquid chemical contained therein. The intention is that only the correct chemical can be used in any particular manufacturing process, because the process will dictate a unique pump connection and a corresponding container with the correct chemical liquid. One example of such a system is disclosed in Osgar et al., "Liquid Chemical Dispensing System With Sensor," U.S. Pat. No. 5,875,921. The Osgar system uses physical configurations, called key codes, to prevent accidental dispensing of an improper liquid from a container. Both the container and a connector have unique key code configurations. The connector must have the same key code configuration as the container for the connector to be properly coupled with the container. The Osgar system also employs a sensor that senses proper coupling of the connector to the container. When the sensor senses a proper coupling of the connector to the container, a pump is enabled. When the container and the connector are not properly coupled, the pump is disabled.

Some prior art systems, however, do allow the pump connectors to be partially connected to the incorrect chemicals such that pumping can take place even though the connection is not proper. In addition, personnel still can attach the wrong chemical to the wrong process or at the wrong time. Such incorrect connections can be dangerous to personnel and have caused millions of dollars of damage to equipment and to articles of manufacture. A system that provides a reliable connection between the correct chemical and the correct process, and enables tracking of incorrect connection attempts by personnel would be a useful improvement over the prior systems.

SUMMARY OF THE INVENTION

The present invention provides a storage and dispensing system for the storage and dispensing of liquids. In particular, the invention substantially eliminates or reduces disadvantages and problems associated with previously developed storage and dispensing systems by using a radio frequency identification tag and a radio frequency antenna to assure proper association of a particular liquid to a particular process.

The present invention relates to a system for handling liquid and a method for the same. The system includes a container capable of holding a liquid. A storage means is coupled with the container for electronically storing information relating to the liquid stored in the container. The system also includes a communication means, for storing (e.g., transmitting) information to and reading (e.g., extracting) information from the storage means. Finally, the system includes a controller means, coupled with the communication means, for controlling processing of the liquid based on information read from the storage means by the communication means.

In one preferred embodiment of the invention, a cap is coupled with an opening in the container (e.g., a fill and/or dispensing port) such that the liquid is sealed in the container by the capped opening. A radio frequency identification (RFID) tag is mounted on the cap and is capable of electronically storing information. The RFID tag can for example comprise a passive RF transponder and an electrically erasable programmable read-only memory (EEPROM). A connector is coupled with the cap such that the liquid can be dispensed from the container through the connector. A radio frequency (RF) antenna is mounted on the connector for storing information to and reading information from the EEPROM on the RFID tag. A microprocessor-based controller is coupled with the RF antenna such that the controller controls processing of the liquid from the container based on information read from the RFID tag by the RF antenna.

In another preferred embodiment, the connector further comprises a connector head and a probe extending from the connector head. The probe is insertable through a center of the cap on the container opening, and into the opening. The probe has a flow passage. A pump is coupled with the probe and with the flow passage for pumping liquid through the probe and the flow passage.

Other embodiments, aspects and features of the invention will be more fully apparent from the ensuing disclosure and appended claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Figure 1:
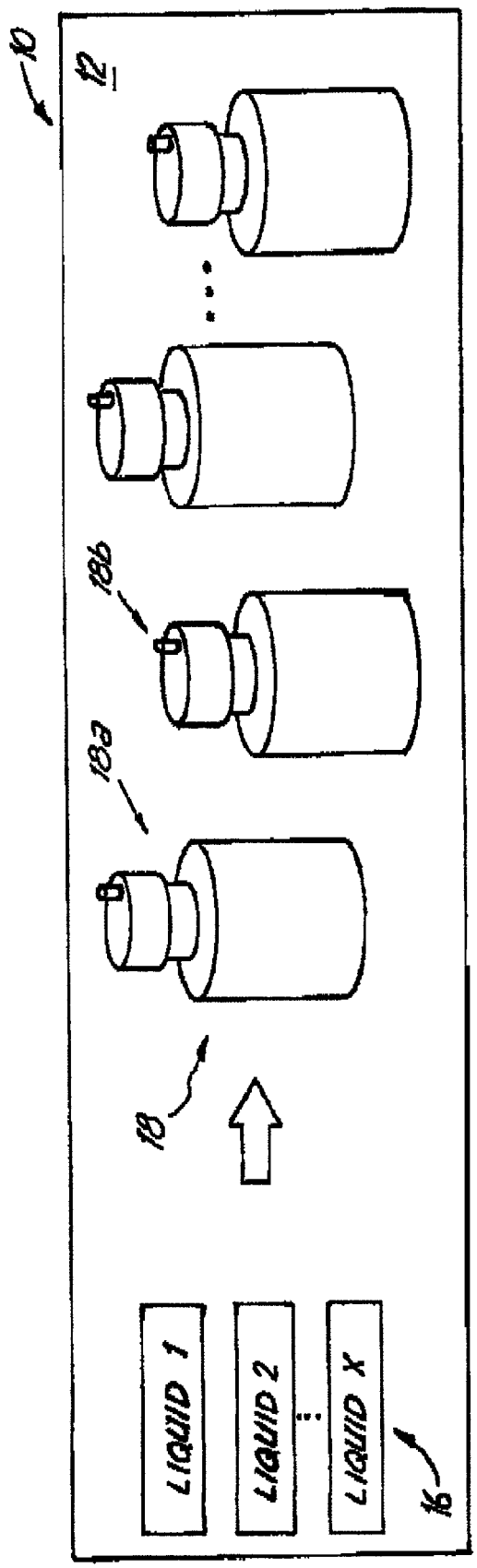
FIG. 1 shows a system for storing, dispensing and processing liquids in accordance with one aspect of the present invention.
Figure 1:
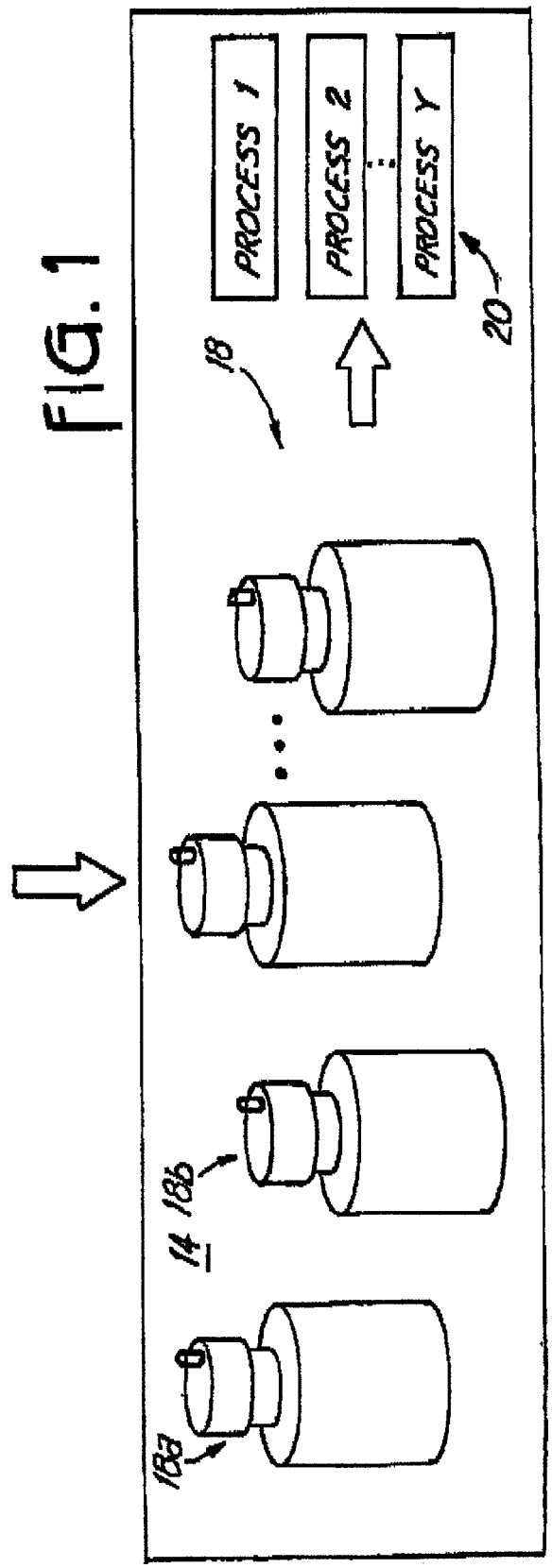

FIG. 1 shows system 10 for storing, dispensing and processing liquids in accordance with the present invention. System 10 includes filling system 12 and processing system 14.

Filling system 12 includes a plurality of liquids 16 and containers 18. In operation of filling system 12, liquids 16 are dispensed into containers 18. Liquids 16 are typically liquid chemicals of suitable type for the intended process, and may in specific applications include: acids; solvents; bases; photoresists; CMP slurries; dopants; inorganic, organic, and biological solutions; pharmaceuticals; and radioactive chemicals. Filling system 12 tracks which of the multiple liquids 16 (LIQUID 1, LIQUID 2, . . . LIQUID X) is placed into which of the respective containers 18, so that liquids 16 in containers 18 can be identified later, as discussed more fully below. After filling of containers 18 has been completed, containers 18 are transported to processing system 14.

Processing system 14 includes a plurality of containers 18 and processes 20 (PROCESS 1, PROCESS 2, . . . PROCESS Y). In operation of processing system 14, liquids 16 contained in containers 18 are used in processes 20. For example, containers 18 may contain a liquid chemical such as photoresist for use in the manufacturing of integrated circuits. Processing system 14 reads containers 18 to determine which liquids 16 are contained within them so that the proper liquid 16 is used in the proper process 20, as discussed more fully below.

Figure 2:
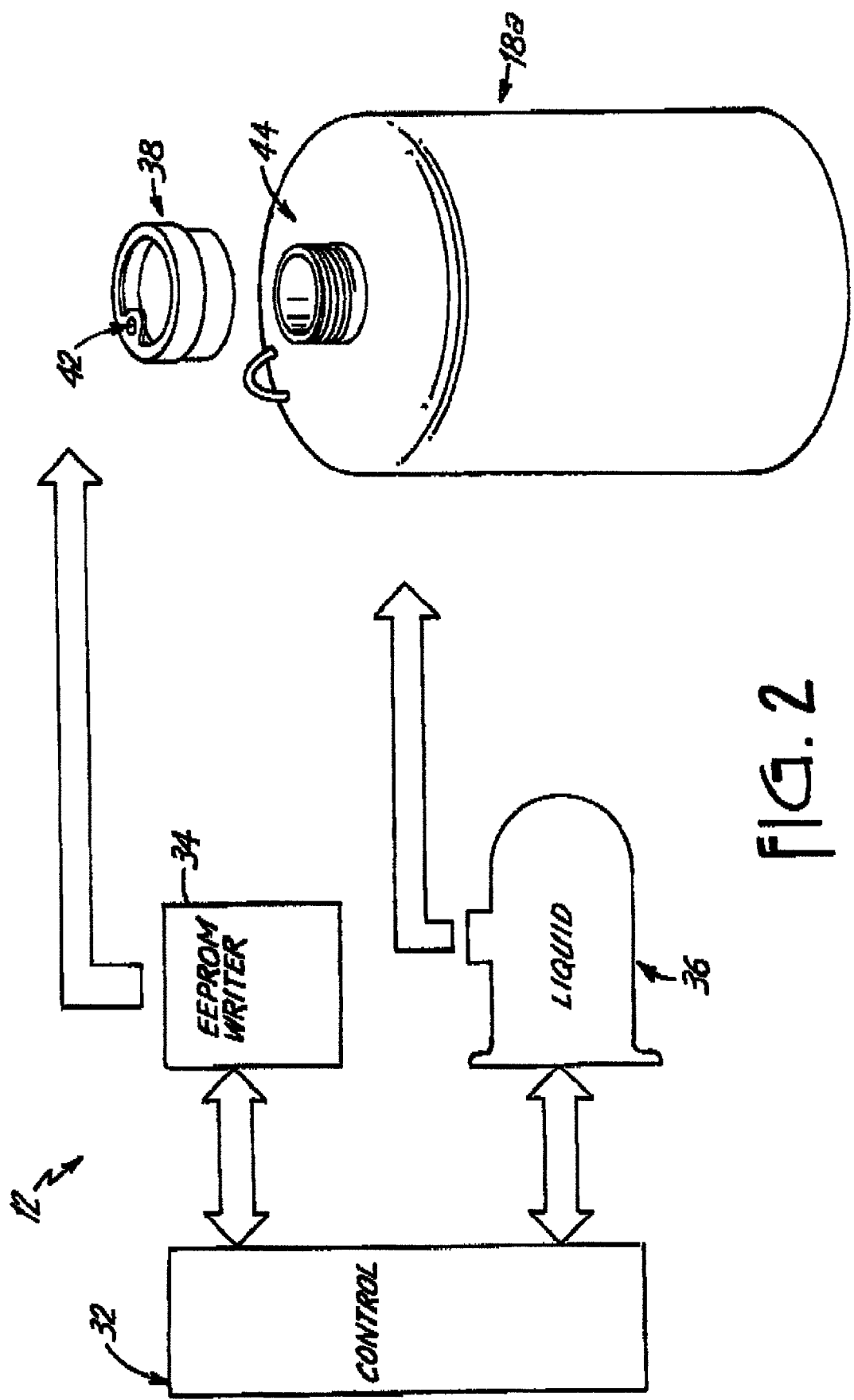
FIG. 2 shows a filling system for filling a container with liquid.

FIG. 2 shows filling system 12 for filling a container with liquid. Filling system 12 includes microprocessor-based control unit 32, electrically erasable programmable read-only memory (EEPROM) writer 34, liquid reservoir 36, cap 38, and container 18a. Control unit 32 is electrically connected to EEPROM writer 34 and liquid reservoir 36. Liquid reservoir 36 is connected to container 18a. Cap 38 includes radio frequency identification (RFID) tag 42. RFID tag 42 includes an EEPROM and a passive radio frequency transponder. EEPROM writer 34 is capable of writing to RFID tag 42 on cap 38.

In operation of filling system 12, control unit 32 regulates dispensing of liquid from liquid reservoir 36 into container 18a. Typically, filling system 12 includes a plurality of liquid reservoirs 36 connected to control unit 32. That is, control unit 32 typically regulates dispensing of a plurality of liquids into a plurality of containers 18. For ease of illustration, a single liquid reservoir 36 and a single container 18a are shown. To begin operation of filling system 12, control unit 32 sends a signal to liquid reservoir 36 instructing liquid reservoir 36 to begin dispensing liquid into container 18a. Liquid reservoir 36 continues dispensing liquid into container 18a until container 18a is filled to an appropriate level. After container 18a is filled, liquid reservoir 36 sends a signal to control unit 32 indicating container 18a is full. Control unit 32 then sends a signal to liquid reservoir 36 to stop dispensing liquid into container 18a.

After container 18a is filled, control unit 32 sends a signal to EEPROM writer 34. This signal contains information about liquid contained in liquid reservoir 36. EEPROM writer 34 subsequently programs the EEPROM contained in RFID tag 42 with information received from control unit 32, in a process known to the art. Information programmed to the RFID tag 42 includes, for example, the type of liquid dispensed into container 18a from liquid reservoir 36, the producer of the liquid contained in liquid reservoir 36, the date of filling of container 18a with liquid from liquid reservoir 36, the date of expiration of the liquid contained in container 18a, and similar useful information. Once container 18a has been filled and RFID tag 42 has been programmed by EEPROM writer 34, cap 38 is secured onto container opening 44 of container 18a. In a preferred embodiment, cap 38 is threadably connected to container opening 44 of container 18. Cap 38 may also be secured onto container opening 44 by, for example, snapping cap 38 onto container opening 44 or vacuum sealing cap 38 onto container opening 44. The method of securing cap 38 onto container opening 44 can be widely varied depending on the properties of the liquid contained in container 18a as well as processing and fabrication considerations. After cap 38 has been secured onto container 18a, container 18a is transported to a processing system.

Figure 3:
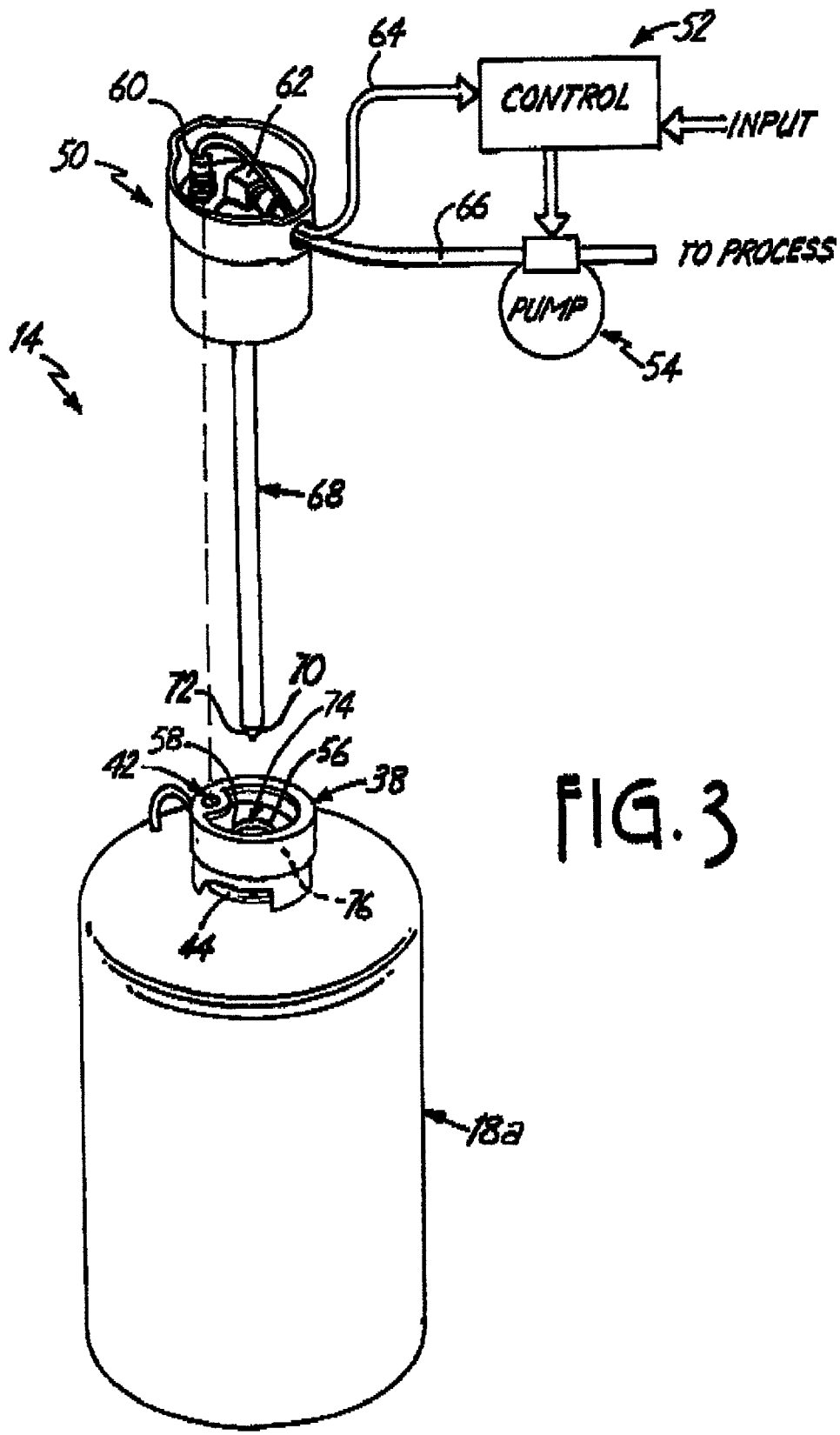
FIG. 3 shows a preferred embodiment of a processing system for dispensing and processing liquid.

FIG. 3 shows a preferred embodiment of processing system 14. Processing system 14 includes cap 38, container 18a, connector 50, control unit 52, and pump 54. Container 18a includes container opening 44. Cap 38 includes RFID tag 42, rupturable membrane 56, and membrane scores 58. Connector 50 includes radio frequency (RF) antenna 60, port adaptor 62, modular antenna line 64, adaptor tube 66, and probe 68. Probe 68 includes lower probe port 70 located adjacent probe tip 72. In a preferred embodiment, cap 38 is threadably connected to container opening 44 of container 18a. After container 18a with cap 38 are transported to the desired location, probe hole 74 and vent hole 76 are exposed. Rupturable membrane 56 is exposed through probe hole 74. Rupturable membrane 56 has membrane scores 58 in its surface. Connector 50 is configured to be interconnected with cap 38.

FIG. 3 shows how the components of processing system 14 are assembled. More specifically, connector 50 is shown being interconnected with cap 38 and container 18a. Probe tip 72 is inserted through probe hole 74 and pressed against rupturable membrane 56 proximate to membrane scores 58. When sufficient pressure is applied on connector 50 toward rupturable membrane 56, probe tip 72 ruptures rupturable membrane 56 along membrane scores 58 allowing probe 68 to be inserted through membrane 56. Continued pressure on connector 50 then allows connector 50 to be moved immediately adjacent cap 38. Probe 68 is then in communication with the interior of container 18a. As such, connector 50 is mounted on container 18a. Adapter tube 66 and port adapter 62 provide a liquid passage from the interior of container 18a to pump 54. When processing system 14 is properly assembled, pump 54 is capable of pumping the liquid in container 18a through port adapter 62 and adapter tube 66 to a manufacturing process, such as the manufacturing of integrated circuits. Typically, processing system 14 includes a plurality of containers 18, a plurality of connectors 50, and a plurality of pumps 54 connected to control unit 52. That is, control unit 52 typically regulates dispensing of liquid from a plurality of containers 18 to a plurality of processes via a plurality of pumps 54. For ease of illustration, a single connector 50, a single container 18*a*, and a single pump 54 are shown.

The operation of pump 54 is controlled by control unit 52. Control unit 52 may receive input from an operator relating to starting and stopping pump 54. For example, an operator seeking to start pumping the liquid chemical in container 18*a* to a manufacturing process may input this information to control unit 52.

Control unit 52, however, is also configured to receive signals from RF antenna 60 via either modular antenna line 64 or RF transmissions. In operation of processing system 14, control unit 52 receives input from a process indicating a liquid needed by the process. For example, in the manufacture of integrated circuits, a layer of photoresist may be needed. Control unit 52 sends a signal to RF antenna 60. Probe 68 of connector 50 is then inserted through probe hole 74 until connector 50 is immediately adjacent to cap 38. Connector 50 is positioned such that RF antenna 60 is located adjacent RFID tag 42. A signal requesting the information stored in the EEPROM of RFID tag 42 is then transmitted from RF antenna 60 to RFID tag 42. The signal is received by the passive RF transponder contained in RFID tag 42. The signal received by the transponder activates RFID tag 42. Subsequently, information stored on the EEPROM contained in RFID tag 42 is read from the EEPROM to the transponder. The transponder then transmits the information contained on the EEPROM to RF antenna 60. RF antenna 60 sends the information received from RFID tag 42 to control unit 52 via modular antenna line 64 or via a RF transmission. Control unit 52 compares information received from RF antenna 60 to information about the liquid needed by the process, and controls pump 54 accordingly. That is, if container 18*a* contains an undesired or unexpected liquid, control unit 52 will disable pump 54. Conversely, if container 18 contains an expected and desired liquid, control unit 52 will enable pump 54.

Consequently, when processing system 14 is not properly assembled and an operator, believing that processing system 14 is properly assembled, inputs information to start pump 54, pump 54 will not operate. In this way, processing system 14 prevents the accidental operation of an improperly assembled system. This will prevent delivery of an improper liquid to a process.

Figure 4:
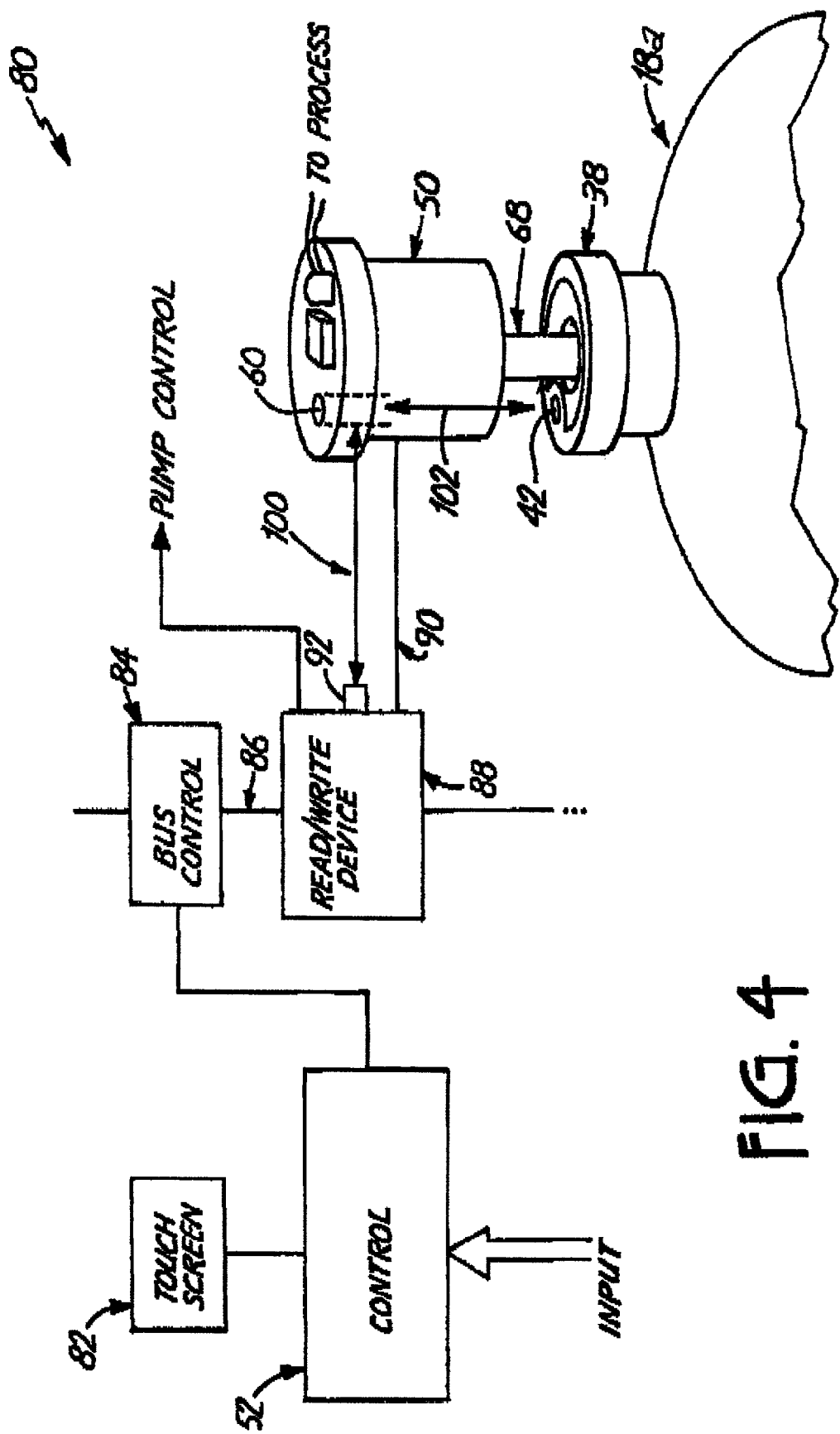
FIG. 4 shows a user-interface in the processing system for dispensing and processing liquid shown in FIG. 3.

FIG. 4 shows a preferred embodiment of user-interface 80 in processing system 14 for dispensing and processing liquid shown in FIG. 3. User interface 80 includes touch screen 82, microprocessor-based control unit 52, bus control unit 84, communication bus 86, read/write device 88, connector 50, cap 38, and container 18*a*. Touch screen 82 is connected to control unit 52. Control unit 52 is connected to bus control unit 84, typically via an Ethernet or other serial communications cable. Control unit 52 also receives input from a process. Bus control unit 84 is connected to read/write device 88 via communication bus 86. Read/write device 88 is connected to connector 50 via modular antenna line 90. Read/write device 88 may also communicate with connector 50 through remote antenna 92. Connector 50 communicates with RFID tag 42 on cap 38 via RF antenna 60 using radio frequency transmissions.

For simplicity of illustration, FIG. 4 shows a single connector 50 connected to communication bus 86 through read/write device 88. In a typical system, a plurality of read/write devices 88 are connected to communication bus 86, each read/write device 88 connected to different connectors 50 coupled with containers 18 containing different liquids. Containers 18 are typically situated in a plurality of drawers, each drawer containing a plurality of positions. Each position is configured to hold one container 18. In operation of user-interface 80, each of containers 18 is graphically displayed on touch screen 82 in its corresponding drawer and position within the drawer. For example, in a system having two drawers and four positions within each drawer, container 18*a* positioned in the second position of the first drawer is graphically displayed on touch screen 82 in the second position of the first drawer. When connector 50 is matched properly with container 18*a* (as described above), the graphic representation of container 18*a* on touch screen 82 is displayed in a first color, typically green. This indicates to an operator that the liquid contained in container 18*a* is ready for dispensing to a process. Conversely, if connector 50 is matched improperly with container 18*a* (as described above), the graphic representation of container 18*a* on touch screen 82 is displayed in a second color, typically red, and a warning message appears on touch screen 82. This indicates to the operator that the liquid contained in container 18*a* will not dispense to a process until the mismatch is corrected.

When container 18*a* needs to be replaced (for example, when container 18 is empty), the operator removes container 18*a* from its position. Touch screen 82 then graphically displays container 18*a*, along with the drawer number and position number of container 18*a*. The operator then exchanges container 18*a* for new container 18*b*, and couples connector 50 with new container 18*b*. If connector 50 is matched properly with new container 18*b* (as described above), all containers 18 are displayed on touch screen 82 in the first color. If connector 50 is matched improperly with new container 18*b* (as described above), new container 18*b* is displayed on touch screen 82 in the second color and a warning message appears on touch screen 82.

Touch screen 82 also allows the operator to choose from a variety of operations using RFID tag 42. Each operation is selectable from a button on touch screen 82 that corresponds to such operation. For example, an operator may view information stored on RFID tag 42 about liquid contained in containers 18, record information to RFID tag 42 about liquid in containers 18 (such as when the liquid is installed into its proper drawer and position, the shelf life of the liquid, what process the liquid is used in, when the liquid is used in a process, how much of the liquid is used in a process, etc.), or enable probe 68 for dispensing liquid from containers 18. The operator touches the button on touch screen 82 corresponding to a desired operation. Touch screen 82 sends the selection made by the operator to control unit 52. Control unit 52 subsequently commands bus control unit 84 to perform the selected operation. The selected operation is performed, and the result is displayed on touch screen 82.

As an example, the operator may desire to view information stored on RFID tag 42 about liquid in container 18*a*. The operator first pushes the button on touch screen 82 corresponding to this operation. Touch screen 82 sends this selection to control unit 52. Control unit 52 then commands bus control unit 84 to access RFID tag 42 on container 18*a*. To access RFID tag 42, bus control unit 84 sends a signal along communication bus 86 to the read/write device accessing RFID tag 42: read/write device 88. Read/write device 88 then accesses RF antenna 60, either via modular antenna line 90 or a RF transmission via antenna 92. In this preferred embodiment, separation 100 between antenna 92 and RF antenna 60 is typically less than five meters for successful RF communication. Next, RF antenna 60 transmits a signal to RFID tag 42. In this preferred embodiment, separation 102 between RF antenna 60 and RFID tag 42 is typically less than ten millimeters for successful RF communication. The signal is received by the passive RF transponder contained in RFID tag 42. The signal activates RFID tag 42 and the requested information is accessed from the EEPROM contained on RFID tag 42. The requested information is then read from the EEPROM by the transponder, and the transponder transmits the information back to RF antenna 60. RF antenna 60 then sends the information to read/write device 88 either via modular antenna line 90 or via RF transmissions to antenna 92. The information is sent along communication bus 86 to bus control unit 84, which in turn sends the information to control unit 52. Once received by control unit 52, information about the liquid in container 18a is displayed on touch screen 82.

The liquid dispensing system of the present invention prevents the accidental operation of an improperly assembled system by storing liquid in a container having a cap with a radio frequency identification tag containing electrically erasable programmable read-only memory. (EEPROM). The EEPROM stores information about the liquid contained in the container. In a processing system, the information contained on the EEPROM can be accessed to prevent the accidental dispensing of an improper liquid and to maintain a database of the liquids used in a process. Also, additional information about the liquid can be written to the EEPROM in the processing system, such as when the liquid is used in a process and how much of the liquid is used in a process. Furthermore, the present invention allows for a standardization of the cap, container, and connector, since the control system now responds to information read from the cap rather than upon sensing a physical connection. This allows for a reduction in the amount of hardware that was necessary to accommodate the physical connectability safety feature of prior art systems.

Although the present invention has been described with reference to preferred embodiments, workers skilled in the art will recognize that changes may be made in form and detail without departing from the spirit and scope of the invention. For example, other forms of electronic storage may be used on RFID tag 42, such as erasable programmable read-only memory (EPROM), programmable read-only memory (PROM), and random-access memory (RAM). Also, the components of processing system 14 which communicate using radio frequencies may be configured to communicate using other regions of the electromagnetic spectrum, such as those in the regions of cellular or infrared communications.

Additional features and functions can be incorporated into the present invention, expanding the system capabilities of the present invention. These features and functions include, but are not limited to Inventory Management. Such an inventory management module may be internal to the use of the present invention in an enterprise-wide network or may be integrated into existing Inventory Management software systems that are in place in individual processing facilities. Such a module could be utilized anywhere from the receiving dock to the empty container disposal center. Inventory management is implementable in a manner that allow users to track material usage, update inventory records, and provide a means of communicating (either automatically or by prompt) when a material needs to be re-ordered via the Internet or other communication tool.

Additionally, these features and functions may include the integration of container sensing input signals that would be processed to send control signal outputs to the tool. The inputs may come from the probe itself or from an external sensing system. Such sensing may include level sensing, temperature sensing or direct sensing of other material properties of the product in the container. This data may be cumulatively compiled to create a history of a container and its contents.

These features and functions may also include the communication of chemical data from the RFID tag directly to the tool itself, thereby providing another level of security and avoiding operator error. Information communicated by the RFID tag could be used to control track functions such as film thickness, spin speed, etc.

The features and advantages of the invention are more fully shown with respect to the following example, which is not to be limitingly construed, as regards to the character and scope of the present invention, but is intended merely to illustrate a specific preferred aspect useful in the broad practice of the present invention.

Example 1

From the same lot of Oxide Slurry OS-70KL material (ATMI Materials Lifecycle Solutions, Danbury, Conn.) several different sample vials were made up, containing the OS-70KL material, to simulate behavior of the liquid in a bag in a drum container of the type generally shown and described herein and in co-pending U.S. patent application Ser. Nos. 10/139,185 and 10/139,186, incorporated herein by reference in their entirety, with varying headspace in the interior volume of the liner.

The sample vials were made up with the following differing headspace levels: 0%, 2%, 5% and 10%. Each of the sample vials was vigorously shaken for one minute by hand, and the liquid in the vial was then subjected to analysis in an Accusizer 780 Single Particle Optical Sizer, a size range particle counter commercially available from Sci-Tec Inc. (Santa Barbara, Calif.), which obtains particle counts in particle size ranges that can then be "binned" algorithmically into broad particle distributions.

The data obtained in this experiment are shown in Table 1 below. The particle counts are shown for each of the particle sizes 0.57 µm, 0.98 µm, 1.98 µm and 9.99 µm, at the various headspace percentage values of 0%, 2%, 5% and 10% headspace volume (expressed as a percentage of the total interior volume occupied by the air volume above the liquid constituting the headspace void volume).

TABLE 1

Size Range Particle Counts for Varying Headspace Volumes in Sample Vials

| Average Particle Size for Range | Initial Particle Count Before Shaking | Particle Count-0% Headspace | Particle Count-2% Headspace | Particle Count-5% Headspace | Particle Count-10% Headspace |
|---|---|---|---|---|---|
| Size Range Particle Counts Immediately After Shaking Vial for One Minute ||||||
| 0.57 µm | 170,617 | 609,991 | 134,582 | 144,703 | 159,082 |
| 0.98 µm | 13,726 | 14,836 | 22,096 | 20,294 | 26,429 |
| 1.98 µm | 2,704 | 2,900 | 5,298 | 4,397 | 6,293 |
| 9.98 µm | 296 | 321 | 469 | 453 | 529 |
| Size Range Particle Counts 24 Hours After Shaking Vial for One Minute ||||||
| 0.57 µm | 110,771 | 1,198,296 | 191,188 | 186,847 | 182,217 |
| 0.98 µm | 11,720 | 18,137 | 21,349 | 20,296 | 24,472 |
| 1.98 µm | 2,701 | 2,383 | 4,658 | 4,272 | 5,704 |
| 9.98 µm | 138 | 273 | 544 | 736 | 571 |

The particle size analyzer presented the data in terms of large-size particle counts, in units of particles per milliliter >a specific particle size in micrometers (μm). The particle count data has been determined to provide a direct correlation between the magnitude of the particle count and wafer defectivity when the reagent containing such particle concentration is employed for manufacturing microelectronic devices on semiconductor wafers.

The data taken immediately after the shaking experiment show some trending toward larger particle counts with increasing headspace values, particularly for particles $\geq 0.98$ μm. Data taken 24 hours later show the same trending toward higher particle distributions.

The data show that increasing headspace in the vial produced increasing aggregations of large size particles, which are deleterious in semiconductor manufacturing applications and can ruin integrated circuitry or render devices formed on the wafer grossly deficient for their intended purpose.

As applied to bag in a drum containers of the type shown and described herein and in co-pending U.S. patent application Ser. Nos. 10/139,185 and 10/139,186 incorporated herein by reference in their entirety, the results of this Example indicate the value of the preferred zero headspace arrangement. Any significant headspace in the container holding high purity liquid, combined with movement of the container incident to its transport, producing corresponding movement, e.g., sloshing, of the contained liquid, will produce undesirable particle concentrations. Therefore, to minimize the formation of particles in the contained liquid, the headspace should be correspondingly minimized to as close to a zero headspace condition as possible.

Although the present invention has been described in detail, it should be understood that various changes, substitutions and alterations can be made hereto without departing from the spirit and scope of the invention as hereinafter claimed.

What is claimed is:

1. A liquid handling system comprising:
   a container capable of holding a liquid, said container having an opening;
   a cap engaged with the opening and sealing the container when liquid is contained therein, said cap having a sealed probe hole therein;
   an information storage device mounted on said cap and adapted to electronically store information relating to the liquid;
   a connector including a connector head adapted to interconnect with said cap and a probe extending downwardly from the connector head, with a liquid flow passage therein for flow of liquid therethrough; and
   an information transmitter mounted on the connector and adapted to wirelessly transmit information to and receive information from the information storage device;
   said connector being constructed and arranged so that said probe is insertable through the probe hole in the cap to establish (i) dispensing contact with liquid contained in the container, and (ii) interconnection of the connector head and the cap to permit liquid to flow from said container through said liquid flow passage in said connector, with said information storage device mounted on said cap, and said information transmitter mounted on said connector, adjacently positioned in information processing relationship to one another.

2. The liquid handling system of claim 1, further comprising a controller coupled with the information transmitter, for controlling processing of the liquid based on information read from the information storage device by the information transmitter, wherein the controller comprises a user-interface capable of receiving input from a user.

3. The liquid handling system of claim 2, wherein the controller further controls processing the liquid based on input received from the user via the user-interface.

4. The liquid handling system of claim 3, wherein the controller further controls processing the liquid by comparing the input received from the user via the user-interface to information read from the information storage device to determine whether the liquid in the container should be dispensed to a process.

5. The liquid handling system of claim 2, wherein the user-interface comprises a touch screen adapted to receive input from the user and displaying information about the liquid contained in the container.

6. The liquid handling system of claim 1, wherein said sealed probe hole in said cap is sealed with a rupturable membrane, said information storage device comprises a radio frequency identification (RFID) tag on the cap, said information transmitter comprises a radio frequency (RF) antenna on the connector head, arranged so that upon interconnection of the connector head and cap, and the RFID tag and the RF antenna are coaxially aligned with one another with a separation therebetween of less than 10 millimeters.

7. The liquid handling system of claim 1, wherein the cap further comprises a vent hole therein.

8. The liquid handling system of claim 6, wherein the rupturable membrane has a scored surface.

9. The liquid handling system of claim 1, wherein the information transmitter comprises a radio frequency (RF) antenna and the information storage device comprises a passive radio frequency identification (RFID) tag.

10. The liquid handling system of claim 9, wherein the RFID tag comprises a passive RF transponder and an electrically erasable programmable read-only memory (EEPROM).

11. A liquid handling system comprising:
    a container having an opening and adapted to hold a liquid;
    a cap adapted to couple with the container proximate to the opening to seal liquid within the container, the cap having a sealed probe hole and vent hole therein;
    a radio frequency identification (RFID) tag mounted on the cap;
    a connector adapted for coupling in adjacent relationship with the cap to permit the liquid to be dispensed from the container through the connector, with the connector including a probe having a liquid flow passage therein, wherein the probe is insertable through the sealed probe hole and into the container to contact the liquid in the container to permit dispensing thereof;
    a radio frequency (RF) antenna mounted on the connector and adapted to store information to and read information from the RFID tag, said RF antenna being located adjacent to the RFID tag and in alignment therewith when the connector and cap are interconnected; and
    a controller coupled with the RF antenna, the controller being adapted to direct processing of the liquid from the container based on information read from the RFID tag by the RF antenna.

12. The liquid handling system of claim 11, wherein the connector further comprises a connector head of generally cylindrical shape, having a top recess therein, with a port adaptor disposed in the recess in liquid flow communication with the probe, and with the RF antenna being located at a peripheral portion of the connector head, wherein the RFID tag is located on a peripheral portion of the cap, and wherein the connector head overfits the cap when the connector and the cap are interconnected, with a separation between the RF antenna and the RFID tag of less than 10 millimeters.

13. The liquid handling system of claim 12, wherein a pump is coupled with the probe and with the liquid flow passage for pumping liquid through the liquid flow passage in the probe.

14. The liquid handling system of claim 11, wherein the RFID tag comprises a passive RF transponder and an electrically erasable programmable read-only memory (EEPROM).

15. The liquid handling system of claim 14, wherein the EEPROM stores information about the liquid contained in the container.

16. A method of handling liquids utilizing a container adapted to hold a liquid and defining an opening, and utilizing a connector including a connector head and a probe extending from the connector head, with the probe including a liquid flow passage adapted to permit liquid flow therethrough during liquid dispensing operation, and with the connector head including a transmitter, the method comprising:
capping the opening with a cap having a sealed probe hole, to seal the container when liquid is contained therein, the cap having an associated electronic storage and sensing device;
electronically storing information about the liquid in the electronic storage and sensing device;
inserting the probe through the probe hole to establish (i) dispensing contact with liquid contained in the container, and (ii) interconnection of the connector head and cap, with the electronic storage and sensing device and said transmitter adjacently positioned in information processing relationship with one another;
wirelessly reading information from the electronic storage and sensing device;
transmitting said information from the storage and sensing device utilizing said transmitter; and
controlling processing of the liquid from the container based on information read from the electronic storage and sensing device and transmitted by said transmitter.

17. The method of claim 16, wherein said transmitter comprises an antenna.

18. The method of claim 16, wherein the electronic storage and sensing device comprises a RFID tag including a passive RF transponder and an electrically erasable programmable read-only memory (EEPROM).

19. The method of claim 18, wherein the EEPROM stores information relating to the liquid contained in the container.

20. A material handling system comprising:
a container capable of holding a material, said container having an opening;
a cap engaged with the opening and sealing the container when material is contained therein, said cap having a sealed probe hole therein;
an information storage device adapted to electronically store information relating to the material;
an information transmitter for wirelessly storing information to and reading information from the information storage device; and
a connector including a connector head and a probe extending downwardly from the connector head, with a flow passage therein for flow of material therethrough during material dispensing operation;
said information storage device being mounted on one of said cap and said connector, and said information transmitter being mounted on the other of said cap and said connector;
said connector being constructed and arranged so that said probe is insertable through the probe hole in the cap to establish (i) dispensing contact with material contained in said container, and (ii) interconnection of the connector head and said cap, with said information storage device and said information transmitter being adjacently positioned in information processing relationship to one another; and
an inventory management system coupled to said information transmitter, and adapted to execute inventory management decisions based on information received from said information storage device.

21. The material handling system of claim 20, wherein the inventory management system comprises a user-interface capable of receiving input from a user.

22. The material handling system of claim 21, wherein the inventory management system further controls processing the material based on input received by the user-interface from the user.

23. The material handling system of claim 22, wherein the material comprises a liquid, and the inventory management system further controls processing the liquid by comparing the input received by the user-interface from the user to information read from the information storage device to determine whether the liquid in the container should be dispensed to a process.

24. The material handling system of claim 21, wherein the user-interface comprises a touch screen capable of receiving input from the user and displaying information about the material contained in the container.

25. The material handling system of claim 20, wherein said sealed probe hole in said cap is sealed with a rupturable membrane, said information storage device comprises a radio frequency identification (RFID) tag on the cap, said information transmitter comprises a radio frequency (RF) antenna on the connector head, arranged so that upon interconnection of the connector head and cap, and the RFID tag and the RF antenna are coaxially aligned with one another with a separation therebetween of less than 10 millimeters.

26. The material handling system of claim 20, wherein the information storage device is mounted on the cap and the information transmitter is mounted on the connector.

27. The material handling system of claim 20, wherein the information storage device is mounted on the connector and the information transmitter is mounted on the cap.

28. The material handling system of claim 20, wherein the information transmitter comprises a radio frequency (RF) antenna and the information storage device comprises a passive radio frequency identification (RFID) tag.

29. The material handling system of claim 28, wherein the RFID tag comprises a passive RF transponder and an electrically erasable programmable read-only memory (EEPROM).

30. A liquid handling system comprising:
a container having an interior for holding a liquid and defining an opening;
a cap engaged with the container adjacent the opening;
an information storage device coupled to any of the container and the cap and adapted to store information relating to the liquid; and
a connector adapted for physically coupling to any of the container and the cap adjacent the opening and having an information transmitter adapted to wirelessly obtain information from the information storage device, wherein the connector includes a downwardly extending probe insertable through the cap and having a passage therein adapted to permit liquid to flow through the probe, and wherein the information storage device and information transmitter are vertically aligned with and adjacent to one another when the connector is physically coupled to any of said container and said cap; and a control element communicatively coupled to the connector and adapted to responsively allow or deny access to the liquid, based on said information, for dispensation of said liquid to a process tool.

31. The liquid handling system of claim 30, wherein said control element has an associated user-interface capable of receiving input from a user.

32. The liquid handling system of claim 31, wherein the control element further controls processing of the liquid based on input received from the user via the user-interface.

33. The liquid handling system of claim 32, wherein the control element further controls processing of the liquid by comparing an input received from the user via the user-interface to information obtained from the information storage device.

34. The liquid handling system of claim 31, wherein the user-interface comprises a touch screen capable of receiving input from the user and displaying information about the liquid contained in the container.

35. The liquid handling system of claim 30, wherein the information storage device is mounted on the cap and the information transmitter is mounted on the connector.

36. The liquid handling system of claim 30, wherein the information transmitter comprises a radio frequency (RF) antenna and the information storage device comprises a passive radio frequency identification (RFID) tag.

37. The liquid handling system of claim 36, wherein the RFID tag comprises a passive RF transponder and an electrically erasable programmable read-only memory (EEPROM).

38. A liquid handling system comprising:

a container having an opening and adapted to hold a liquid;

a cap having a radio frequency identification (RFID) tag mounted thereon and adapted for coupling with the container along the opening for sealing the liquid in the container;

a connector including a liquid flow passage therein, wherein the connector has a radio frequency (RF) antenna mounted thereon for reading information from the RFID tag and the connector is adapted for physically coupling with the cap for dispensing the liquid from the container through the liquid flow passage in the connector, with the RFID tag in information transmission relationship with the RF antenna when the connector is coupled with the cap; and a controller coupled with the RF antenna for processing the liquid based on the information read from the RFID tag.

39. The liquid handling system of claim 38, wherein the connector further comprises:

a connector head; and a probe extending from the connector head and insertable through a center of the cap and into the opening, the probe having said liquid flow passage therein, and the RF antenna being aligned with and in proximity to said RFID tag, with a separation therebetween of less than 10 millimeters when the connector is coupled with the cap.

40. The liquid handling system of claim 39, further comprising a pump coupled with the probe and adapted to pump or extract liquid through the liquid flow passage.

41. The liquid handling system of claim 38, wherein the RFID tag comprises a passive RF transponder and an electrically erasable programmable read-only memory (EEPROM).

42. The liquid handling system of claim 41, wherein the EEPROM stores information about the liquid contained in the container.

43. A method of handling liquids utilizing a container adapted to hold a liquid and defining a container opening, the container having a cap coupled thereto along the container opening, the cap having an information storage device and defining a cap opening, the method comprising:

storing information about the liquid in the information storage device;

mounting to the cap a connector having a probe defining a liquid flow passage therein adapted to dispense fluid from the container and having an information transmission assembly adapted to transmit information to and from the information storage device, wherein the information transmission assembly is automatically placed in communicable proximity with the information storage device during the mounting step;

wirelessly reading the information from the information storage device; and controlling processing of the liquid based on the information with a controller in at least intermittent communication with the information transmission assembly, wherein said processing of the liquid includes dispensing of liquid from the container through the liquid flow passage of said connector.

44. The method of claim 43, wherein the information storage device comprises a RFID tag including a passive RF transponder and an electrically erasable programmable read-only memory (EEPROM).

45. The method of claim 44, wherein the EEPROM stores information relating to the liquid contained in the container.

46. A material identification system comprising:

a container adapted to hold a material and defining a container opening;

a cap engaged with the container adjacent the container opening;

an information storage device coupled to any of the container and the cap, and adapted to store information relating to a material disposed within the container;

an information communication device adapted to wirelessly read the information from the information storage device; and a controller communicatively coupled to the information communication device to receive the information and adapted to regulate processing of the material based on the information, wherein the connector includes a flow passage adapted for dispensing material from the container, and the information communication device is disposed in or on the connector.

47. The material identification system of claim 46, wherein the controller includes a user-interface adapted to receive input from a user.

48. The material identification system of claim 47, wherein the controller further regulates processing of the material based on input received from the user via the user-interface.

49. The material identification system of claim 48, wherein the controller further regulates processing of the material by comparing the input received by the user-interface from the user to information read from the information storage device to determine whether the material should be processed.

50. The material identification system of claim 47, wherein the user-interface comprises a touch screen capable of receiving input from the user and displaying information about the material.

51. The material handling system of claim 46, wherein the information storage device is coaxially aligned with the information communication device with a separation distance therebetween of less than 10 millimeters.

52. The material handling system of claim 46, wherein the cap contains a vent hole therein, and the cap contains a material dispensing hole therein through which a portion of the connector extends.

53. The material handling system of claim 46, wherein the information communication device comprises a radio frequency (RF) antenna and the information storage device comprises a passive radio frequency identification (RFID) tag.

54. The material handling system of claim 53, wherein the RFID tag comprises a passive RF transponder and an electrically erasable programmable read-only memory (EEPROM).

55. The material handling system of claim 54, wherein said information communication device is further adapted to direct information to the information storage device for storage in the EEPROM.

56. The liquid handling system of claim 38, wherein said radio frequency (RF) antenna is further adapted to direct information to the RFID tag.

57. A storage and dispensing system for storage and dispensing of liquid, comprising:
   a portable container containing a semiconductor processing liquid and including a container opening;
   a cap securable to said container proximate to the container opening and having an associated a radio frequency identification tag, the cap being arranged when secured to the opening to seal the container for containment of liquid therein;
   a connector including a connector head and a probe extending therefrom, wherein the probe has a liquid flow passage therethrough, the probe is adapted for insertion through the cap into the container, the connector is adapted to engage the cap, and the connector is arranged for flow of liquid from the container through the probe to a location exterior of the container when pumping action is applied to the connector;
   a pump operatively coupled to the probe to apply pumping action to the connector for pumping semiconductor processing liquid from the container to a liquid-using process tool during dispensing operation; and
   a controller communicatively coupled to the pump;
   wherein the connector head includes a radio frequency antenna arranged to communicate (i) with the radio frequency identification tag in the cap when the connector is engaged with the cap, and (ii) with the controller;
   wherein the antenna and the radio frequency identification tag in the cap are separated by a distance of less than 10 millimeters when the connector is engaged with the cap; and
   wherein the controller is arranged to control the pumping action in accordance with information obtained from the radio frequency identification tag in said cap, and communicated by the radio frequency antenna to the controller.

58. A storage and dispensing system for storage and dispensing of liquid, comprising:
   a portable container containing a semiconductor processing liquid and including a container opening;
   a cap securable to said opening and including an associated electronic information storage component, said cap being arranged when secured to said opening to seal the container for containment of said liquid therein; and
   a connector engageable with the cap, the connector including a connector head and a probe extending therefrom, wherein the probe has a flow passage therethrough, the probe is insertable through the cap into the container, and the connector is arranged for flow of liquid from the container through the probe to a location exterior of the container when pumping action is applied to the connector;
   wherein said connector head includes an antenna adapted to communicate (i) wirelessly with the electronic information storage component associated with the cap when the connector is engaged with the cap, and (ii) with a controller arranged to control said pumping action in accordance with information obtained from said electronic information storage component, and communicated by said antenna to the controller.

59. The storage and dispensing system of claim 58, wherein the electronic information storage component comprises an electronic storage element selected from the group consisting of EEPROMs, EPROMs, PROMs and RAMs.

60. A liquid handling system with electronic information storage, comprising a multiplicity of liquid storage and dispensing systems as claimed in claim 30, wherein at least some of said containers contain different liquids than other containers, and wherein the multiplicity of liquid storage and dispensing systems are operatively linked to a unitary user interface by their connectors.

61. The liquid handling system of claim 60, wherein containers of said multiplicity of liquid storage and dispensing systems are situated in a plurality of drawers, with each drawer containing a plurality of positions, and each position configured to hold a single container, and wherein the unitary user interface includes a display screen arranged to graphically display each of the containers in its corresponding drawer and position within the drawer.

62. The liquid handling system of claim 61, wherein the display screen is arranged to graphically display each of said containers (i) in a first color when the container is correctly matched to a connector, and (ii) in a second color when the container is incorrectly matched to a connector.

63. The liquid handling system of claim 62, wherein said first color is green, and said second color is red.

64. The liquid handling system of claim 63, wherein the containers in said drawers contain liquids for manufacturing integrated circuits.

65. The liquid handling system of claim 30, wherein said container is portable in character, and contains a liquid photoresist material.

66. A liquid storage and dispensing system comprising:
   a portable container including an opening communicating with an interior volume for holding liquid;
   a cap engageable with the container proximate the opening to seal liquid in the interior volume of the container;
   an RFID tag mounted on the cap, and arranged to contain information relating to any of the liquid and use of said liquid;
   a connector engageable with the cap, said connector including (i) a tube arranged to extend through the cap into the interior volume of the container when the connector is engaged with the cap, to enable withdrawal of liquid from the container when pumping action is exerted on the liquid through the connector, and (ii) an RF antenna arranged to reside in information communicating proximity to the RFID tag when the connector is engaged with the cap, and to transmit information received from the RFID tag, for use in storage and/or dispensing of the liquid.

67. The liquid storage and dispensing system of claim 66, wherein said information communicating proximity of the RF antenna to the RFID tag is less than 10 millimeters.

68. The liquid storage and dispensing system of claim 66, further comprising pumping circuitry coupled to the connector to exert said pumping action on the liquid through the connector.

69. The liquid storage and dispensing system of claim 68, wherein the pumping circuitry includes a pump operatively coupled with a pump controller arranged to modulate pumping action of said pumping circuitry.

70. The liquid storage and dispensing system of claim 69, wherein the pump controller is operatively arranged to receive signals from the RF antenna and responsively modulate said pumping action.

71. The liquid storage and dispensing system of claim 66, operatively coupled with an integrated circuitry manufacturing tool for dispensing of an integrated circuitry manufacturing liquid to the tool.

72. The liquid storage and dispensing system of claim 71, operatively arranged for transmission of information from the RFID tag to the tool.

73. The liquid handling system of claim 1, further comprising a sensor adapted to monitor at least one physical property of liquid within the container, wherein the information storage device is adapted to receive information from the sensor.

74. The method of claim 16, wherein the electronic storage and sensing device comprises a sensor element, the method further comprising sensing a property of or condition experienced by the liquid using the sensor element.

75. The material handling system of claim 20, further comprising at least one sensor element adapted to sense a property of or condition experienced by the liquid.

76. The material handling system of claim 75, wherein the at least one sensor element is integrated with the information storage device.

77. The liquid handling system of claim 30, wherein the control element is integrated with the connector.

* * * * *

UNITED STATES PATENT AND TRADEMARK OFFICE
CERTIFICATE OF CORRECTION

PATENT NO. : 7,747,344 B2  Page 1 of 1
APPLICATION NO. : 10/139104
DATED : June 29, 2010
INVENTOR(S) : Kevin T. O'Dougherty It is certified that error appears in the above-identified patent and that said Letters Patent is hereby corrected as shown below:

Column 8, lines 23-24: "in co-pending U.S. patent application Ser. Nos. 10/139,185 and 10/139,186" should be -- in co-pending U.S. patent application Ser. Nos. 10/139,185, subsequently issued as U.S. Patent 7,188,644, and 10/139,186, subsequently issued as U.S. Patent 6,698,619 --.

Column 9, lines 18-19: "in co-pending U.S. patent application Ser. Nos. 10/139,185 and 10/139,186" should be -- in co-pending U.S. patent application Ser. Nos. 10/139,185, subsequently issued as U.S. Patent 7,188,644, and 10/139,186, subsequently issued as U.S. Patent 6,698,619 --.

Signed and Sealed this

Fourteenth Day of December, 2010

David J. Kappos
*Director of the United States Patent and Trademark Office*